US007530103B2

(12) United States Patent
Willman et al.

(10) Patent No.: US 7,530,103 B2
(45) Date of Patent: May 5, 2009

(54) PROJECTION OF TRUSTWORTHINESS FROM A TRUSTED ENVIRONMENT TO AN UNTRUSTED ENVIRONMENT

(75) Inventors: Bryan Mark Willman, Kirkland, WA (US); Paul England, Bellevue, WA (US); Kenneth D. Ray, Seattle, WA (US); Keith Kaplan, Bothell, WA (US); Varugis Kurien, Redmond, WA (US); Michael David Marr, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 755 days.

(21) Appl. No.: 10/638,199

(22) Filed: Aug. 7, 2003

(65) Prior Publication Data

US 2005/0033980 A1    Feb. 10, 2005

(51) Int. Cl.
*G06F 7/04* (2006.01)
*H04L 9/00* (2006.01)
*G06F 11/30* (2006.01)
(52) U.S. Cl. .................. 726/21; 713/164; 713/193
(58) Field of Classification Search .............. 726/32, 726/21; 713/164, 193, 2; 711/163
See application file for complete search history.

(56) References Cited

U.S. PATENT DOCUMENTS

| 5,235,642 | A | * | 8/1993 | Wobber et al. | 713/156 |
| 5,892,900 | A | | 4/1999 | Ginter et al. | 395/186 |
| 5,961,656 | A | * | 10/1999 | Fuller et al. | 714/718 |
| 6,138,239 | A | * | 10/2000 | Veil | 726/10 |
| 6,185,678 | B1 | * | 2/2001 | Arbaugh et al. | 713/2 |
| 6,304,262 | B1 | | 10/2001 | Maloney et al. | 345/418 |
| 6,308,208 | B1 | | 10/2001 | Jung et al. | 709/224 |
| 6,397,242 | B1 | | 5/2002 | Devine et al. | 709/1 |
| 6,408,391 | B1 | | 6/2002 | Huff et al. | 713/201 |
| 6,496,847 | B1 | | 12/2002 | Bugnion et al. | 709/1 |
| 6,505,300 | B2 | * | 1/2003 | Chan et al. | 713/164 |
| 6,553,403 | B1 | | 4/2003 | Jarriel et al. | 709/202 |
| 6,754,691 | B1 | * | 6/2004 | Gomi et al. | 709/202 |
| 6,775,536 | B1 | * | 8/2004 | Geiger et al. | 455/411 |
| 6,823,456 | B1 | * | 11/2004 | Dan et al. | 713/178 |
| 6,938,164 | B1 | * | 8/2005 | England et al. | 713/193 |

(Continued)

FOREIGN PATENT DOCUMENTS

EP    1 055 990 A1    11/2000

(Continued)

OTHER PUBLICATIONS

Bugnion, E. et al., "Disco: Running Commodity Operating Systems on Scalable Multiprocessors", *Proceedings of the 16th Symposium on Operating Systems Principles (SOSP)*, Oct. 1-14, 1997.

(Continued)

*Primary Examiner*—Emmanuel L Moise
*Assistant Examiner*—Techane J Gergiso
(74) *Attorney, Agent, or Firm*—Woodcock Washburn LLP

(57) ABSTRACT

In a single machine that has entities running in an untrusted environment and entities running in a trusted environment, the trustworthiness of the entities in the trusted environment is projected to the entities in the untrusted environment. This is applicable, for example, to Microsoft®'s Next Generation Secure Computing Base (NGSCB), where a regular operating system (e.g., the Windows® operating system) hosts a secure operating system (e.g., the nexus).

60 Claims, 4 Drawing Sheets

U.S. PATENT DOCUMENTS

| | | | |
|---|---|---|---|
| 7,082,507 B1 * | 7/2006 | Christie et al. | 711/163 |
| 7,131,141 B1 * | 10/2006 | Blewett et al. | 726/12 |
| 7,152,165 B1 * | 12/2006 | Maheshwari et al. | 713/193 |
| 7,194,623 B1 * | 3/2007 | Proudler et al. | 713/164 |
| 7,243,230 B2 * | 7/2007 | England et al. | 713/168 |
| 7,302,698 B1 * | 11/2007 | Proudler et al. | 726/2 |
| 2002/0023212 A1 * | 2/2002 | Proudler | 713/164 |
| 2002/0046275 A1 | 4/2002 | Crosbie et al. | 709/224 |
| 2003/0041255 A1 * | 2/2003 | Chen et al. | 713/193 |
| 2003/0204632 A1 * | 10/2003 | Willebeek-LeMair et al. | 709/249 |
| 2003/0226033 A1 * | 12/2003 | Zinda et al. | 713/201 |
| 2004/0025016 A1 * | 2/2004 | Focke et al. | 713/164 |
| 2004/0117318 A1 * | 6/2004 | Grawrock | 705/66 |
| 2004/0128544 A1 * | 7/2004 | Hondo et al. | 713/201 |
| 2004/0250075 A1 * | 12/2004 | Anthe et al. | 713/175 |
| 2004/0268135 A1 * | 12/2004 | Zimmer et al. | 713/189 |

FOREIGN PATENT DOCUMENTS

| | | |
|---|---|---|
| WO | WO 00/038034 A1 | 6/2000 |
| WO | WO 02/075547 A1 | 9/2002 |
| WO | WO 03/029934 A1 | 4/2003 |
| WO | WO 03/05099 A1 | 6/2003 |

OTHER PUBLICATIONS

Carroll, A., et al., "Microsoft 'Palladium': A Business Overview," 11 pages, Aug. 2002, http://www.microsoft.com/PressPass/features/2002/jul02/0724palladiumwp.asp.

Coffing, C.L., "An x86 Protected Mode Virtual Machine Monitor for the MIT Exokernel", *Department of Electrical Engineering and Computer Science*, May 21, 1999, 1-109.

Goldberg, R.P., "Survey of Virtual Machine Research", *Computer*, Honeywell Information Systems and Harvard University, 34-45.

Popek, G.J. et al., "Formal Requirements for Virtualizable Third Generation Architectures", *Communications of the ACM*, 1974, 17(7), 412-421.

PressPass—Information for Journalists, "At WinHEC, Microsoft discusses Details of Next-Generation Secure Computing Base," New Orleans, May 7, 2003, 5 pages, http://www/microsoft.com/presspass/features/2003/may03/05-07NGSCB.asp.

Smith, J.E., "An Overview of Virtual Machine Architectures", Oct. 27, 2001, 1-20.

Sugerman, J. et al., "Virtualizing I/O Devices on VMware Workstation's Hosted Virtual Machine Monitor", *Proceedings of the 2001 USENIX Annual Technical Conference*, 2001, 1-14.

Wheeler, D.M., "Java Security for a Java Server in a Hostile Environment", *Computer Security Applications Conference*, 2001, 64-73.

Waldspurger, C.A., "Memory Resource Management in VMware ESX Server", *Proceedings of the 5th Symposium on Operating Systems Design and Implementation*, Dec. 9-11, 2002, 15 pages.

"At WinHEC, Microsoft Discusses Details of Next-Generation Secure Computing Base", http://www.microsoft.com/presspass/features, Oct. 26, 2004, 8 pages, XP-002302516.

Trouessin, G. et al., "Improvement of Data Processing Security by Means of Fault Tolerance", *Proceedings of the 14th National Computer Security Conference*, 1991, 6 pages, CP002302515.

* cited by examiner

PROJECTION OF TRUSTWORTHINESS FROM A TRUSTED ENVIRONMENT TO AN UNTRUSTED ENVIRONMENT

FIELD OF THE INVENTION

This invention relates in general to the field of computer security. More particularly, this invention relates to the use of plural execution environments (e.g., operating systems) on a single computing device, and provides techniques that support the trustworthiness of such operating systems or environments.

BACKGROUND OF THE INVENTION

The first computers were only able to run a single program at a time. In modern times, however, computers are expected to be able to run several different pieces of software at once. For example, typical multi-tasking operating systems can run several application programs at once on a single machine. In view of this and the evolution of a shared, open network (i.e., the Internet), security and privacy have become two important and difficult issues facing the computer industry. As the personal computer grows more central to home, work, and school, consumers and business customers alike are increasingly aware of privacy and security issues. Improving the ability of software and hardware to protect the integrity of digital information and the privacy of computer users has become a critical focus for both software developers and hardware manufacturers. Microsoft Corporation, Redmond, Wash. has introduced the Next-Generation Secure Computing Base (NGSCB) personal computer platform which provides security and privacy in an operating system.

In the conventional NGSCB within a computer 110, as shown in FIG. 2, a "right-hand side" (RHS) security system works in conjunction with a traditional "left-hand side" (LHS) system and central processing unit (CPU). The RHS is designed to protect against malicious software while preserving the operating system's openness. With NGSCB, applications run in a protected memory space that is highly resistant to software tampering and interference. Typically, there is one chipset in the computer 110 that both the LHS and RHS use. The LHS and RHS are a logical, but physically enforced, division or partitioning of the computer 110.

The LHS comprises traditional applications 205, 210, such as Microsoft® Word® and Microsoft® Excel®, along with a conventional operating system 201, such as the Microsoft® Windows® operating system. Although two applications are shown, typically any number can be implemented.

The RHS comprises trusted agents 255, 260, along with a "nexus" 251. A nexus is a "high assurance" operating system that provides a certain level of assurance as to its behavior and can comprise all the kernel mode code on the RHS. For example, a nexus might be employed to work with secret information (e.g., cryptographic keys, etc.) that should not be divulged, by providing a curtained memory that is guaranteed not to leak information to the world outside of the nexus, and by permitting only certain certified applications to execute under the nexus and to access the curtained memory. The nexus 251 should not interact with the main operating system 201 in any way that would allow events happening at the main operating system 201 to compromise the behavior of the nexus 251. The nexus 251 may permit all applications to run or a machine owner may configure a machine policy in which the nexus 251 permits only certain agents to run. In other words, the nexus 251 will run any agent that the machine owner tells it to run. The machine owner may also tell the nexus what not to run.

The nexus 251 isolates trusted agents 255, 260, manages communications to and from trusted agents 255, 260, and cryptographically seals stored data (e.g., stored in a hard disk drive). More particularly, the nexus 251 executes in kernel mode in trusted space and provides basic services to trusted agents 255, 260, such as the establishment of the process mechanisms for communicating with trusted agents and other applications, and special trust services such as attestation of a hardware/software platform or execution environment and the sealing and unsealing of secrets. Attestation is the ability of a piece of code to digitally sign or otherwise attest to a piece of data and further assure the recipient that the data was constructed by an unforgeable, cryptographically identified software stack.

A trusted agent is a program, a part of a program, or a service that runs in user mode in trusted space. A trusted agent 255, 260 calls the nexus 251 for security-related services and critical general services, such as memory management. A trusted agent is able to store secrets using sealed storage and authenticates itself using the attestation services of the nexus. Each trusted agent or entity controls its own domain of trust, and they need not rely on each other.

The RHS further comprises a security support component (SSC) 253 that uses a public key infrastructure (PKI) key pair along with encryption functions to provide a secure state.

NGSCB provides features such as "attestation", "sealed storage", and "strong process isolation". Attestation lets other computers know that a computer is really the computer it claims to be, and is running the software it claims to be running. Because NGSCB software and hardware is cryptographically verifiable to the user and to other computers, programs, and services, the system can verify that other computers and processes are trustworthy before engaging them or sharing information. Thus, attestation allows the user to reveal selected characteristics of the operating environment to external requestors.

Sealed storage allows the user to encrypt information so that it can only be accessed by a trustworthy application. This can include just the application that created the information in the first place, or any application that is trusted by the application that owns the data. Therefore, sealed storage allows a program to store secrets that cannot be retrieved by non-trusted programs, such as a virus or Trojan horse.

Strong process isolation provides a trusted space by carving out a secure area (the RHS). Operations that run on the RHS are protected and isolated from the LHS, which makes them significantly more secure from attack.

NGSCB also provides secure input and output. With NGSCB, keystrokes are encrypted before they can be read by software and decrypted once they reach the RHS. This means that malicious software cannot be used to record, steal or modify keystrokes. Secure output is similar. The information that appears onscreen can be presented to the user so that no one else can intercept it and read it. Taken together, these things allow a user to know with a high degree of confidence that the software in his computer is doing what it is supposed to do.

Despite the substantial trust resources available to the RHS, the LHS remains untrusted. The present invention addresses this and other deficiencies of current trustworthy computing systems.

SUMMARY OF THE INVENTION

The present invention provides a mechanism for projecting the trustworthiness of entities in a trusted environment to entities in an untrusted environment.

Systems and methods are described in which an untrusted environment and a trusted environment are provided. A base monitoring agent runs in the trusted environment. The base monitoring agent monitors the untrusted environment.

According to one embodiment, the monitoring agent is associated with an application, and the monitoring agent monitors its associated application for events or behaviors that may indicate an attack. The trusted nature of the monitor agent allows these events/behaviors to be detected and reported reliably, thereby projecting trustworthiness of the trusted environment into the untrusted environment. The base monitoring agent may approve, prohibit or modify an untrusted environment event reported to or discovered by the monitoring agent. Reported to covers cases such as the hardware reporting an attempt to move the GDT (global descriptor table) to the nexus which would in turn report it to the base monitoring agent, for example. Discovery would be a case in which the base monitoring agent (for the OS) or a monitoring agent (for some application) discovers a problem by scanning the memory of the un-trusted application, for example.

For another embodiment, the base monitoring agent responds to input received from a secure input. For example, the base monitoring agent may refuse to allow changes to the untrusted environment without receiving approval via a secure input. As another example, the base monitoring agent may refuse to allow changes to the untrusted environment unless the changes are described by a package that is signed by an approved party.

For yet another embodiment, the monitoring agent uses sealed storage to keep a secret for an operating system or an application residing in the untrusted environment. The monitoring agent may refuse to reveal the secret to the operating system or the application unless the operating system or application has a digest that matches the owner of the secret. Alternately, the monitoring agent may refuse to reveal the secret to the operating system or the application unless the operating system or application is on a list of digests that may read the secret.

According to other features, the monitoring agent uses a test to determine if a legitimate entity is requesting the secret. One such test includes examining the entity's stacks and assuring that the stacks have legal stack contents. Moreover, the monitoring agent may edit a state of the untrusted environment to make it secure or otherwise acceptable. The state may comprise an initial configuration or an error report option.

Additional features and advantages of the invention will be made apparent from the following detailed description of illustrative embodiments that proceeds with reference to the accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF PREFERRED EMBODIMENTS

Overview

In a single machine that has entities running in an untrusted environment and entities running in a trusted environment, the present invention provides a mechanism for projecting the trustworthiness of the entities in the trusted environment to the entities in the untrusted environment. The invention is directed to mechanisms used when a first execution environment (e.g., an operating system) hosts a second execution environment. The invention applies to situations such as Microsoft®'s Next Generation Secure Computing Base (NGSCB), where a regular operating system (e.g., the Windows® operating system) hosts a secure operating system (e.g., the nexus). Various mechanisms are described that allow the second environment to project its trustworthiness to the first environment.

Example Computing Environment

Figure 1:
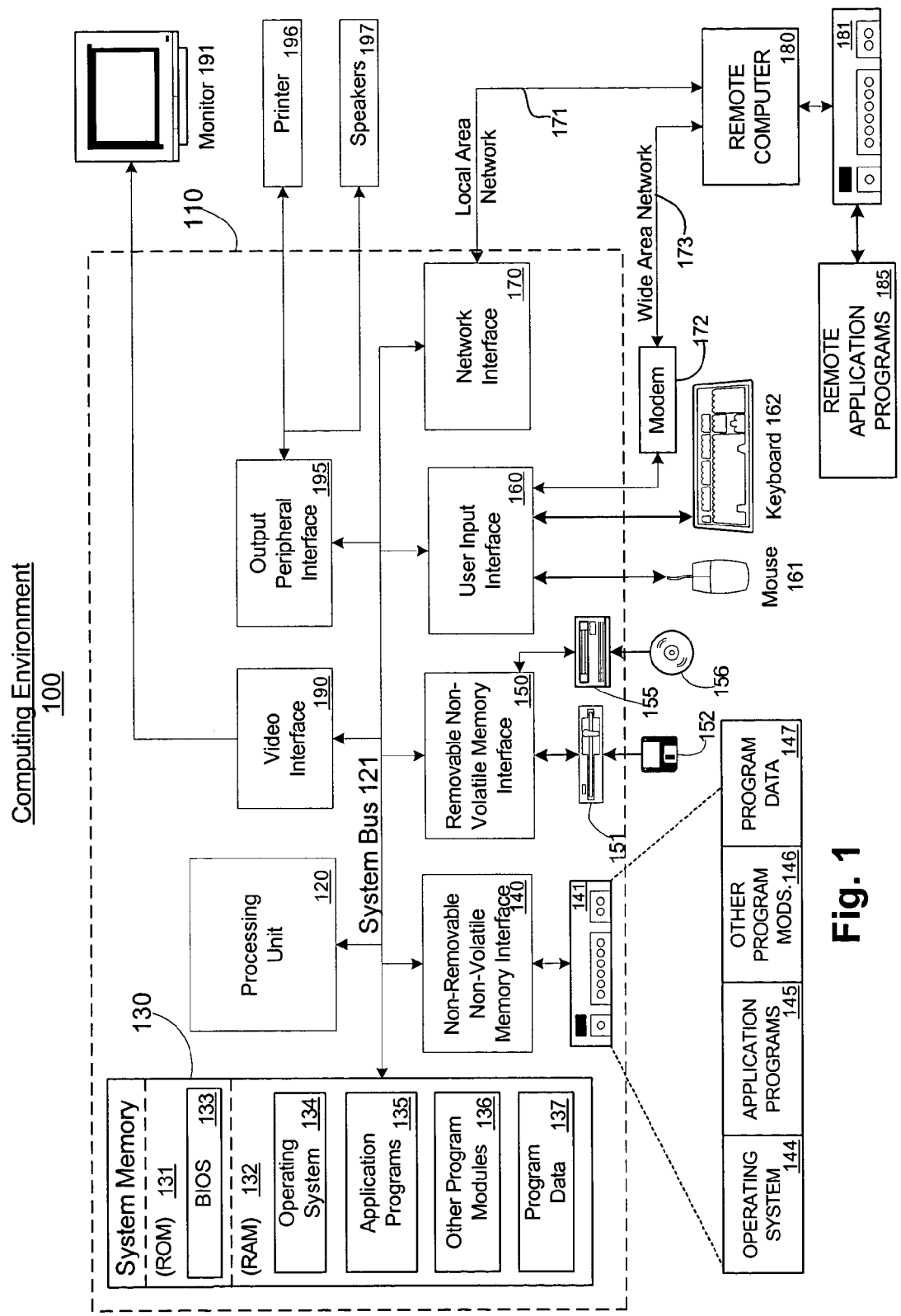
FIG. 1 is a block diagram showing an exemplary computing environment in which aspects of the invention may be implemented.

FIG. 1 illustrates an example of a suitable computing system environment 100 in which aspects of the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, mobile phones, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and non-volatile media, removable and non-removable media. By way of example, and not limitation, computer readable media may comprise computer storage media and communication media. Computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or non-volatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/non-volatile computer storage media. By way of example only, FIG. 1 illustrates a hard disk drive 140 that reads from or writes to non-removable, non-volatile magnetic media, a magnetic disk drive 151 that reads from or writes to a removable, non-volatile magnetic disk 152, and an optical disk drive 155 that reads from or writes to a removable, non-volatile optical disk 156, such as a CD-ROM or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150. It is further contemplated that the present invention can also be implemented on an embedded microprocessor in which the CPU and all of the memory are on a single die in a single package.

The drives and their associated computer storage media, discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181.

It will be appreciated that the network connections shown are exemplary and other means of establishing a communications link between the computers may be used.

EXAMPLE EMBODIMENTS

As previously described, it is known in the art that a computer can be configured to provide two distinct environments: trusted and untrusted. Ordinary code whose trustworthiness has not been verified (i.e., code whose behavior has not been verified, or that cannot be ruled out from possibly serving a malevolent purpose) runs in the untrusted environment. Ordinary application software, such as games, word processors, spreadsheets, etc., as well as ordinary operating systems, device drivers, and debuggers, generally fall into the untrusted category. Code whose trustworthiness has been verified in some manner may run in the trusted environment. Some portion of the computer's memory (i.e., the "isolated" or "curtained" memory) is designated as being accessible only to the trusted environment.

For the following discussion, an agent is "trusted" if it has been instantiated according to a secure procedure designed to preserve its integrity or make apparent any breach of its integrity. For example, the agent may be initiated through a trusted procedure that verifies the agent's identity and the environment in which it is running (attestation), it may be assigned a secure memory location (curtained memory) that is accessible to no other agent, trusted or untrusted, and it may be capable of sealing secrets. Such a trusted agent can be uniquely and reliably identified.

In the trusted environment, there are limitations on what code is allowed to do. For example, there are fewer trusted APIs (versus the very rich set of API in a typical LHS), agents running in the trusted environment may only communicate with each other via restricted formal Inter-Process Communication (IPC) mechanisms, and agents may have access to a more restricted and primitive set of API and services for presenting text and images to the user. These limitations reduce the complexity and, consequently, the attack surface of the trusted environment and the trusted agents that operate within it. The untrusted environment, on the other hand, is similar to the environment typically created by the operating system on an "open" computing system (e.g., a personal computer, a handheld computer, etc.)—i.e., nearly any code is permitted to execute in such an untrusted environment, and code running in the standard environment has full access to a large and rich set of programming services and interfaces. The untrusted environment and the trusted environment can be further divided into sub-environments. For example, the untrusted environment can be divided into an untrusted user mode (where ordinary applications execute), and an untrusted kernel mode (where the ordinary operating system executes). Similarly, the trusted environment can be divided into a trusted user mode (where special, trusted applications execute) and a trusted kernel mode (where the trusted operating system that creates the trusted environment for trusted applications executes).

When trusted and untrusted environments co-exist in the same computer system, the trusted environment may take steps to ensure that its trustworthiness cannot be affected by anything that happens in the untrusted environment, or by any user mode code in the trusted environment. Embodiments of the present invention provide a mechanism for projecting or otherwise using the trustworthiness of the trusted side for the benefit of the untrusted side.

Figure 2:
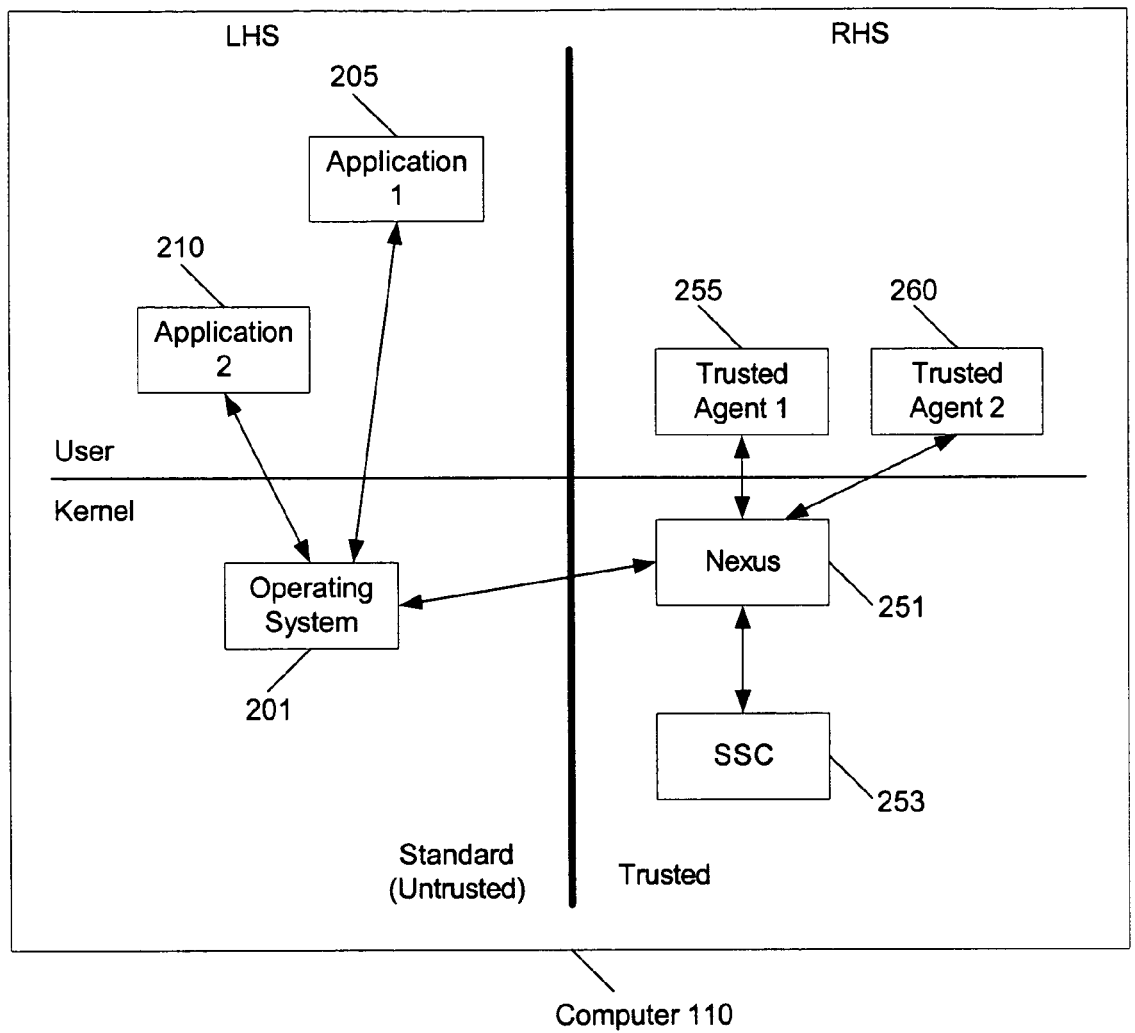
FIG. 2 is a block diagram of an existing NGSCB system having both trusted and untrusted environments.
Figure 3:
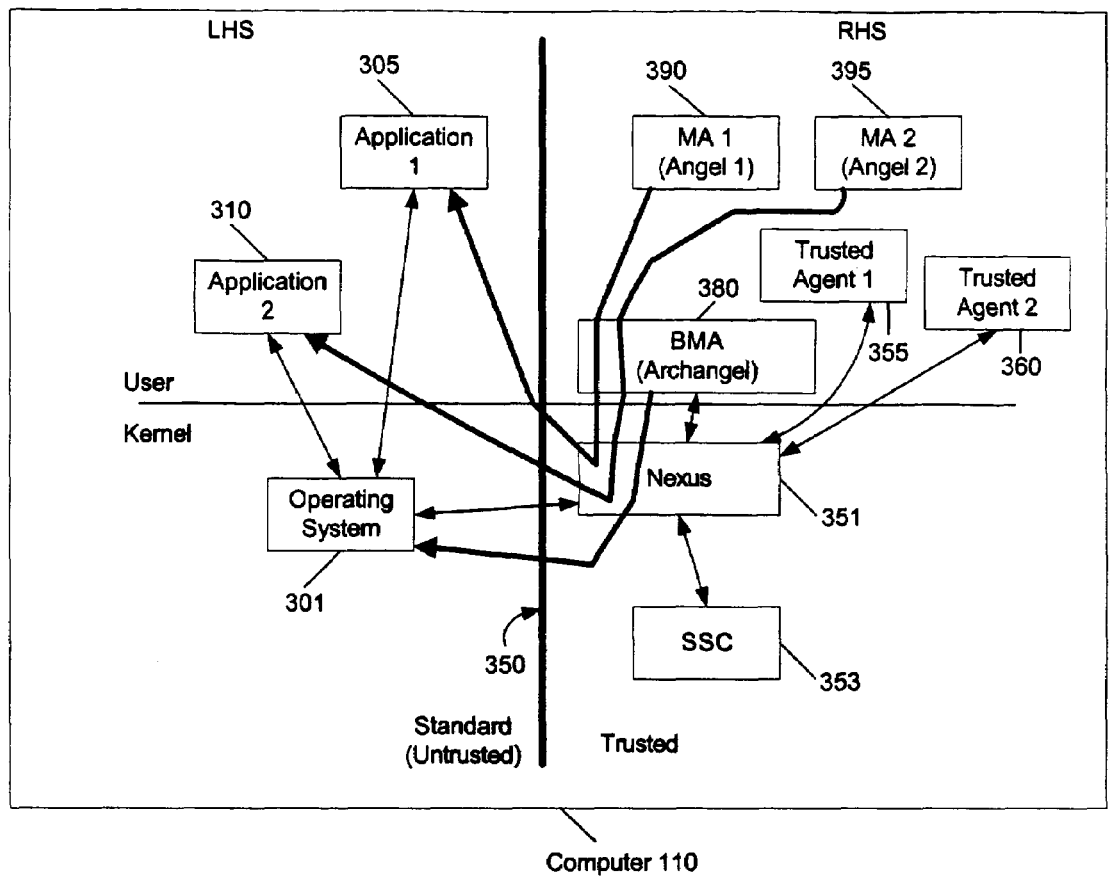
FIG. 3 is a block diagram of an exemplary projection system in accordance with the present invention.
Figure 4:
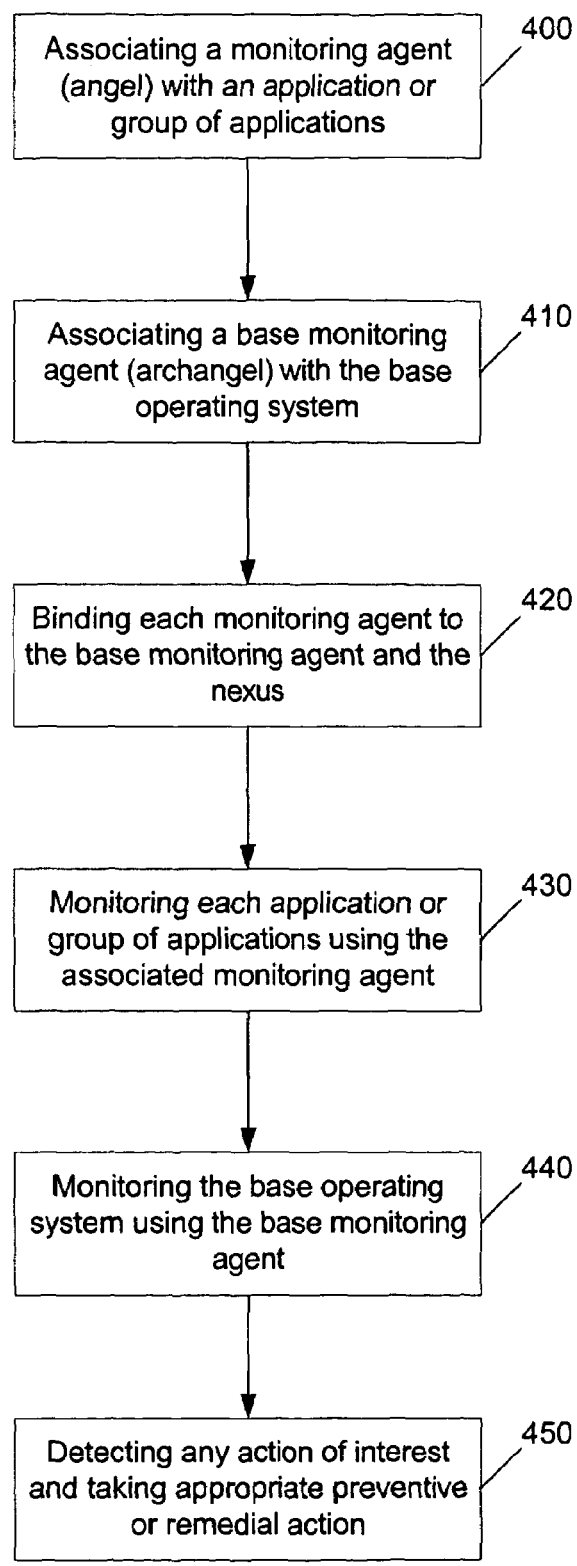
FIG. 4 is a flow chart of an exemplary method of projection in accordance with the present invention.

FIG. 3 is a block diagram of one embodiment of a projection system in accordance with the present invention, and FIG. 4 is a flow chart of one embodiment of method of projection in accordance with the present invention. The LHS of the system running on the computer 110 is similar to that described above with respect to FIG. 2. Two applications 305, 310 are running in conjunction with an operating system 301. Portions of the RHS are also similar to that described with respect to FIG. 2. Two trusted agents 355, 360 are running along with a nexus 351 and SSC 353. It is contemplated that any number of applications can be run on the LHS and any number of trusted agents can run on the RHS.

FIG. 3 shows a system in which the operating system 301 and nexus 351 execute on a single computer 110. A logical separation 350 between operating system 301 and nexus 351 permits certain communications to occur, while protecting the nexus 351 against events that originate in the operating system 301.

In the embodiment illustrated by FIG. 3, operating system 301 is a host operating system, and nexus 351 is a guest hosted by OS 301. That is, OS 301 provides certain services and resources for nexus 351, such as memory and processor time. For one embodiment, logical separation 350 allows nexus 351 to rely on certain resources of operating system 301, while still allowing nexus 351 to protect itself from actions (either malicious or innocent) that arise at operating system 301 and might cause nexus 351 to behave in a manner contrary to its behavioral specifications. For example, nexus 351 and trusted resources associated with it, e.g., SSC 353, may manage logical separation. It will be understood, however, that the invention is not limited to the particular form of nexus 351. Mechanisms are contemplated that allow separation 350 to be constructed so as to allow for this balance of interaction and protection.

It should be noted that FIG. 3 shows operating system 301 as a "host" and nexus 351 as a "guest." In general, this characterization refers to the fact that, in these examples, operating system 301 provides certain operating system infrastructure that is used by operating systems 301 and nexus 351 (e.g., device drivers, scheduling, etc.). Nexus 351 is a "guest" in the sense that it may rely on certain infrastructure resources of operating system 301 rather than provide them itself. However, it should be noted that the parameters of what makes an operating system a "host" or a "guest" are flexible. It should be appreciated that the techniques described herein can be applied to the interaction of any two or more operating systems running on the same machine (or even on the same set of connected machines). Two or more operating systems that run on a single machine are examples of "environments" that may need to interact with each other on a single machine, although it will be understood that the invention is not limited to traditional operating systems.

Projection is the mechanism by which some of the powers and properties of trusted agents (on the RHS) can be extended to LHS code. According to one example, projection allows the powers of the NGSCB personal computer platform to be applied to existing code. For example, rather than porting an application such as Microsoft® Excel® to the RHS, projection in accordance with the present invention allows the construction of a monitoring agent (also referred to herein as an angel) for the application (also referred to herein as a mortal), which in turn permits the existing application to run with many of the same useful properties as a trusted agent. Projection may be applied to both the LHS operating system (e.g., Microsoft® Windows®) and to any LHS application programs (e.g., Microsoft® Office®) for which some level of trusted operation is desirable. Projection may also be applied to LHS device drivers. Thus, as described further below, projection allows trusted agents to protect, assure, attest, and extend, LHS operating systems, services, and programs.

FIG. 3 shows a monitoring agent 390 that corresponds to application 305 and monitoring agent 395 that corresponds to application 310 (step 400 in FIG. 4). Each monitoring agent or angel protects its associated application.

For one embodiment, the creator of the LHS entity of interest (e.g., an application) also creates an angel that guards the LHS entity. This allows the creator to provide the angel with a deep knowledge of the application it monitors. Such an angel can be more sensitive to anomalies in the application it monitors and so protect and validate it more effectively. For example, a base monitoring agent created by an operating system developer may incorporate detailed knowledge about the operating system's memory management that allows it to identify suspicious memory operations quickly.

For another embodiment, an angel may take corrective or preventive action if it detects an anomalous or suspicious activity in its associated application. For example, the angel may detect an attempt by its associated application to alter a key variable in memory deemed invariant by the application creator, and intercept the write to the variable. Such a write operation would likely indicate, at the least, corruption of the application code, if not outright subversion by malevolent, e.g., viral, code. In short, an angel acts as a monitoring agent to watch for negative or suspicious activities in its associated application and take appropriate corrective or preventive action. Its actions may be circumscribed to prevent the angel from damaging its associated application. An angel can be attached to a particular entity, program, or application, for example, or a group of such entities, programs, and/or applications.

A base monitoring agent (also referred to herein as an archangel) 380 is associated with the base operating system (i.e., the LHS OS 301) (block 410). For one embodiment, the base monitoring agent 380 is written by the creator of the LHS operating system. This allows the base monitoring agent 380 to incorporate detailed knowledge about the LHS operating system, which makes it more sensitive to anomalous behavior by the associated operating system.

For example, an archangel could know the format of the virtual address database, the process database, and the PFN (page frame number) database, and based on this, detect cases in which rogue device drivers had made illegal mappings to processes by mapping PFNs they should not have. Thus, the archangel could detect mappings not made by the memory manager (by a rogue device driver, for example), and could detect cross process mappings that should not be there.

In such a case, an archangel could conspire with an altered mortal OS. The OS and the archangel might agree, for example, that the PFN database should always be consistent whenever a particular lock is not held, and that this consistency should be representeable via checksum. So, at periodic intervals, the archangel could inspect the lock, and finding it unlocked (it is a memory variable and thus easy to test) go and checksum the PFN database. If the archangel finds the checksum does not match, then it knows that the PFN database has been tampered with.

Moreover, an archangel could know the control variables for the kernel debugger, and force the control variables to disable use of the kernel debugger.

An additional example includes process loading: monitor the loader, the cache manager, page fault handler, etc. to ensure that the correct bits are correctly loaded into a user mode process (or any other module loaded in the system), or properly signed, perhaps listed in a list of hashes kept within a table known by the archangel. The archangel would be able to anticipate when the loader, page fault handler, etc. would need to map code/data into or out of a process (paging, etc.). The RHS could keep the LHS physical pages for that process locked (to even the LHS OS) unless the OS was performing known good functions. The RHS controls the page tables for LHS processes. Thus, there are a number mechanisms that an archangel writer could bake into the archangel to restrict bad behavior.

A further example includes process hardening. There are known and approved mechanisms for one process modifying another process. The archangel can ensure that all shared memory maps, as well as copying of data into or out of a different process space are restricted. Another example involves the read only kernel, in which all "text" pages (code pages) of the kernel and device drivers are locked down.

The archangel 380 also supports per-process (restricted access) projection to angels. This means that angels, which are like agents in that the system will run any angel the user asks it to (consistent with user policy) and which are not part of the attestation vector, as defined below (i.e., the archangel is in effect part of the configuration of the machine), could wreak havoc, invading left side privacy, prying into mortal applications they are not supposed to apply to, for example. Therefore, it is desirable that angels are very strongly bound to particular applications (mortals). This is preferably done by permitting an angel to only affect a mortal that the angel starts, or, allowing an angel to only be applied to a mortal that matches a declared digest in the angel's manifest, with the digest check done by the archangel, and only after the mortal application calls with the digest of angel to start it. This is desirable because it makes it safe and practical to allow any application vendor to write an angel for their application, and let any user use it, without risking making havoc or destroying privacy for everything else.

Thus, the archangel is both the agent that watches over the LHS, and an agent that offers services to other angels. Because the archangel has the most detailed knowledge of LHS process structures, it will likely be the archangel that decides which angel can bind to which LHS process. Restriction means that an angel (which is not part of the nexus attestation vector) can only touch processes that it starts, or that call for it to protect them. This keeps angels from acting at random on LHS processes. This division (archangel gets OS level powers and is validated like the nexus, angels get restricted application level powers and can be run freely like any other agent) is desirable.

For one embodiment, angels may include the archangel (and by extension the LHS base OS) in their attestation vectors. An attestation vector is a list of digests of security relevant components that establish the security relevant configuration of an entity. For example, the digest for an agent might include the machine or motherboard itself, the nexus, and the agent itself, along with other information. This stack of numbers is a strong, reliable, indicator of what the agent is, and what environment the agent is running in. It allows another entity to trust that it is dealing with "the real agent" or not. Attestation vectors stack (so the digest of the agent is not part of the vector for the nexus, but the digest of the nexus is part of the digest for the agent). So when something's attestation vector is included in another thing, this means that they are all being bound together into a recognizable security configuration. A property of an attestation is that it very strongly identifies the security relevant configuration of a system.

Put another way, an attestation vector is a list of digest values that define a software identity of the RHS. Preferably, the software loaded on the RHS is digested before being loading and the process itself is well isolated so that it cannot change. This is an inductive process: the hardware signs the digest of the nexus (attests to the digest of the nexus), and the nexus in turn attests the agent. In this way, an external party can validate these digests against a known list to determine if that outside party approves the software running on the system. The angel and archangel, because they are running on the RHS, have well-defined code identities. For this reason, these code identities can be listed in the attestation vector which describes the environment in which the LHS code is running. Because the angel cannot completely control the execution of the LHS code, this code identity statement is not as strong as a code identity statement of a RHS agent, but it does mean that the given piece of LHS code is running under the restrictions of the angel, archangel, and nexus that do have strong code identities.

Embodiments of an archangel may expose some set of APIs to the angels to provide support for some functions and/or features of the angels. For example, for any memory operation, the archangel will desirably intermediate. An angel might desire to examine the covered-application code at virtual address VA=100. However, it may not be known what physical address that maps to. The nexus does not know about such structures. Therefore, instead, the archangel (which knows how the LHS OS works) uses basic nexus services (that only archangels can call on) to read relevant LHS kernel memory. The archangel uses data from the LHS OS memory to compute correct mappings for LHS application memory. The angel is then told what covered-application address corresponds to the angel address, and the angel can then inspect those contents and continue processing. In short, for process bound angels (i.e., angels that only apply to authorized processes rather than roaming over LHS state at random), it is desirable that the archangel interpret LHS data structures.

An additional exemplary function includes providing a secured IPC channel that will only allow the LHS application and the RHS angel to see the data. The LHS kernel normally would be able to see all pages that go through an IPC channel between the LHS and the RHS, but if those pages can only be accessed under the watchful eye of the archangel, then high assurance is provided that only the process in question (the process controlled by the given angel) can see the data in the channel. Another exemplary function gives the angel the ability to control what modules (e.g., DLLs) and which versions of those modules can be loaded into the process space of a given process.

As a trusted entity, the archangel 380 has access to the memory associated with the LHS and is notified anytime something happens on the LHS. The archangel 380 is preprogrammed with a body of knowledge that it uses to detect inconsistencies to determine if any action should be taken in the interest of security or protection. For example, the archangel 380 can trap certain sets of LHS events. These may be events that are allowed by the LHS and that are not precluded by the nexus 351 or the trust environment it manages. For example, the archangel 380 can detect improper mappings on the LHS (which the nexus 351 would otherwise allow) which indicate a possible attack or security issue. The archangel 380 can also perform a consistency check.

For the embodiment shown in FIG. 3, each angel is bounded or otherwise supervised by the archangel 380 and the nexus 351 (block 420). The archangel 380 enforces the binding between an angel and its associated LHS code, which limits the ability of angels to affect privacy and security, for example, on the LHS.

It is desirable that the behavior of angels be constrained to affecting only the processes they are supposed to be attached to, because the nexus 351 and archangel 380 will run any angel that the user directs them to run, in accordance with the user's policies. The archangel has powers on a par with the nexus, and will be scrutinized to about the same level. For angels, as for any other agent, the nexus will run whatever the user tells them. So while nexus and archangels are constrained, ordinary angels (like agents) are not (though the user can set policies that tell the nexus to run or not run agents or angels signed by a particular evaluator, for example).

It is desirable that angels be restrained. For example, an angel with a signature block that says "angel for a first program" must not be allowed to use LHS base OS memory, or to use the memory of other programs. Allowing that would violate many user rights, and make angels dangerous rather than helpful. So the archangel makes sure that angels only get access to LHS programs that they are supposed to be able to access.

A trusted agent preferably has no more power than any LHS program. In particular, a trusted agent cannot look into LHS OS nor control nor edit the LHS OS configuration state. Instead, angels are preferably only allowed to inspect or modify the memory of the mortals to which they apply. Further, in some embodiments, the archangel might disallow an angel from changing the code of the mortal, restricting the angel to reading anything in the user mode address space of its mortal and allowing it to write the non-shared read-write memory space of the mortal. However, some mechanisms require that a mortal call to the angel be allowed to return not to the call point, but rather, to a computed return point. This allows the angel to force some events to start at known correct addresses in the mortal—a strong way to combat trampoline attacks based on corrupted stacks altering return addresses.

An angel can only monitor its associated entity or group of entities (block 430), and is no more trusted than any other agent. An angel cannot monitor or otherwise look at unassociated entities. In particular, an angel has one or more of the following properties:

a. The angel can monitor the user mode memory of only the process or processes to which it is attached (i.e., the mortal) (not a power normally afforded RHS code—see above).

b. Only the archangel can see the kernel mode memory of the LHS OS to which it is attached.

c. The angel can be applied to only those LHS processes that call and ask for it or is only applied to LHS processes that it starts.

d. The angel can be restricted by declarative enforcement. For example, the nexus and/or the archangel may constrain the angel to project on only those processes which contain executables that match the executables declared in the manifest for the angel. Thus, for example, an angel for "hackertool" cannot project onto a LHS application by accident or by malice without somebody changing the manifest for the angel. Such a manifest change would be obvious to a policy tool.

The archangel 380 may enforce the above restrictions (blocks 440 and 450). For this purpose the archangel may be given extensive access to the LHS and, in which case it is subject to a level of scrutiny similar to that of the nexus (i.e., intense scrutiny). For example, the archangel has power over the LHS OS, and thus over anything that runs on the LHS. Put another way, the archangel can read any LHS memory, but has no special RHS powers, such as access to RHS kernel memory, or ability to see into other agent processes, or restrict, augment, modify, etc the nexus or other RHS agents. An angel can only read the address space of the program to which it applies (i.e., angels have special powers which apply only to the mortals they apply to). The archangel may also read all the LHS memory (step 440), while offering process specific services so that angels can only see into the address space of the programs that they monitor and protect.

An angel may "project" its protectee in at least the following ways (steps 430 and 450):

a. It may lock or mark as read-only various elements of memory, possibly in coordination with protectee behavior, to prevent certain changes (e.g., virus attacks) to the protectee.

b. It may perform some key operations for the protectee, within its trusted space.

c. It may insist on protectee specific protections, such as limiting what configuration changes can be made, or allowing such changes to be made if approved by an authorized human using a secure input mechanism.

d. It may scan protectee memory and state at desired intervals looking for consistency errors, corruptions, and so on, and warn the user or halt the protectee before further damage or unintended/unauthorized action occurs.

e. It may release sealed/encrypted data to the protectee only as needed, to minimize the amount of such data that may be attacked at any one time.

1. It may use sealed storage to keep sealed secrets for the LHS (or an LHS application) and refuse to give those secrets to any LHS (or LHS application) which does not have a digest either matching the secret owner, or listed as allowable by the secret owner.

f. Given proper API, it may alter the execution state of the protectee; that is, it can direct threads to known execution points, redirect the flow of control in the target application, or perform branch computation and execution for the target application. It may also edit configuration state, startup state, or the like, to force things into acceptable modes for secure/correct operation of the protectee.

g. An angel may call the archangel and ask the archangel to perform prevention, protection, discovery, or reaction, on the behalf of the protectee.

h. An angel may extract (by call or by memory inspection, for example) output data from the application, validate such data (e.g., checksumming, etc.) and then present this data using secure output hardware.

Part of the functionality of the entity or application can be moved into the angel. Likewise, part of the functionality of the LHS kernel can be moved to the archangel. An application creator may implement some of the application's functions in the angel. Though this would increase the RHS burden, it would allow the transferred functions to be performed in the trusted environment. Similarly, a portion of the LHS OS 301 can be moved in the archangel 380.

An angel can be loaded or invoked in several ways. A LHS program, such as application 305 can call for its angel 390. In this manner, for example, upon startup of an application, the corresponding angel gets loaded. Alternatively, an angel can be invoked from the RHS, and the angel then invokes the corresponding LHS process or application. The angel uses the archangel to call through to the LHS and request that the application be started. The archangel then binds the agent to the application. For one embodiment, the APIs that the nexus and the archangel offer to the application angel let it see only the process it creates, and perhaps children thereof.

As another alternative, the LHS program, can be invoked by manifest, and then diverted to the RHS which starts the angel, which calls back to the LHS to start the corresponding LHS process or application. Typically, an LHS program is started by naming the file that contains it (an API that is, for example, "run c:\somedir\someotherdir\someprogram.exe").

For RHS code (an agent or angel), it is started by naming a manifest, and the manifest names the binary. This is location independent. Also, manifests are typically signed and certified, for example, so they are much harder to spoof. Thus, an exemplary mechanism would be to present a combined left/right manifest to the RHS (nexus) which would start both the LHS application and the related angel, and bind them together. Moreover, the angel can be used to start the application from either the LHS or the RHS.

In an embodiment of the invention, the archangel may confirm that the initially loaded code image of the LHS process matches a declared target code image associated with the angel. The declared target code image may be provided through the angel's manifest. This prevents code that claims to be an angel for a particular application from starting another application instead, which provides additional security against attack.

According to some embodiments of the invention, an angel is prevented from editing the code image of the LHS application or process with which it is associated. The angel can read/write data, but it can only read code.

These and similar policies may be employed to prevent angels from running without supervision or restrictions over the LHS, and rogue angels are prevented from spoofing using the LHS programs and applications.

In addition to the initiation mechanisms described above, there are other ways to make sure the correct angel is attached to the correct LHS (or RHS) application and remains attached to it. A running application may be altered by an attacker before making a call to its agent or an LHS virus may intercept and permute its call to target some other angel.

Embodiments of the present invention may address this by processing calls from an application to its angel through a trusted authority like the archangel or the nexus. For example, the archangel may digest the calling LHS application, and compare the digest to a list of "approved" digests associated with the RHS angel. If they do not match, either because the LHS app has been permuted, or because the call has been modified to target a different angel, the call fails, and the system can warn the user, and/or take any other number of actions.

System policy can be used to specify which angels may attach to which LHS applications. Using a strong policy mechanism provides a hard to spoof, hard to misinitialize mechanism for setting up such dependencies.

In some embodiments, an angel preferably has adjustable or various programmable levels of inspection for targeting threats to the associated application. The sensitivity of the angel to a perceived threat or attack can be adjusted.

In addition to providing projection (defense, guardianship, advice, for example) to LHS OS or applications, an angel might also be applied to an agent running in the trusted computing environment. In such a case, a target agent (normally a paranoid entity) trusts the angel that attaches to it. This allows an outside watcher process to head off various bugs and exploits in the target agent. The angel can enforce security invariants as opposed to scanning for security errors (e.g., as in conventional anti-virus technology) and the use of the stiff process separation and protection that a nexus provides.

For one embodiment, the agent is a virtual machine, presenting an "effectively identical duplicate copy" of some real machine, into which an OS image has been launched. A trusted environment may allow an agent to access the virtual machine's process memory. The accessing agent may monitor process memory to protect the virtual machine against attacks from the image it contains. A trusted environment may allow an angel to project the OS image in the virtual machine, and allow angels to project applications in the virtual machine. It is contemplated that the same mechanisms normally applied to LHS applications are applied to the virtual machine environment instead.

For one embodiment of the invention, the nexus provides the archangel with an API for memory inspection and alteration (at least). API support for trapping and reacting to attempts to change control structures facilitates projection. For example, on the x86 architecture, protection for control structures such as GDT, LDT, IDT, debug registers, TR, etc. may be provided through an API. GDT refers to the global descriptor table, and LDT refers to the local descriptor table. Locking down the GDTR (global descriptor table register) stops attacks that depend on warping the meaning of virtual addresses so as to allow jumps to places the attacker normally could not jump. IDT is the interrupt dispatch table which controls the routing of interrupts. The location of the IDT is indicated by the IDTR (interrupt dispatch table register). Locking down the IDTR makes projection more powerful by stopping attacks in which the attacker uses the IDT and a posted interrupt to force a branch to code they otherwise could not reach.

It is desirable that the Trusted Environment (i.e., the RHS) and the Open Environment (i.e., the LHS) are connected in some way. The connection allows the Trusted Environment to examine state and be informed of events in the Open Environment. The teachings here work for structures including, but by no means limited to, structures below:

1. The RHS and LHS are on the same machine, and the RHS can directly examine LHS memory (while the LHS cannot examine RHS memory without permission).
2. The RHS and LHS are on different processors, possibly with different memories, but a bus, network, port, or other interconnect allows the RHS to see into LHS memory. For example, an ARM service processor could run a fully trusted stack, and the trusted stack could be able to inspect main memory of an x86 MP system. For example, one could have a machine with x86 main processors and an ARM or PowerPC as a service processor, and use the mechanisms of the present invention to allow the service processor to watch over software on the main processors.
3. If the RHS can receive notification of LHS events (e.g., changes of maps) but not alter or prevent them, or cannot see into LHS memory, some part of projection (e.g., a weak part) is still possible.
4. The RHS can inspect LHS memory at will, can control (i.e., prevent or alter) LHS edits to LHS memory mapping and address translation structures, control where the interrupt dispatch vector points (but need not control the interrupt controller, though if such control is offered, there is leverage in that). It is contemplated that determining a list of state/events that the RHS desirably is able to fully control to support strong projection is a task to be done for each processor architecture, and a worker skilled in the art will understand that the list is different for different architectures.
5. In one embodiment, changes of the x86 TR register and setting of the hardware debug registers are also controllable by the RHS.

In the prior art hardware, the trusted environment is not guaranteed to run because it may depend on common interrupt hardware, the LHS interrupt dispatch table, and so on.

In the hardware listed above, being able to control the IDT (on an x86, or the equivalent elsewhere) allows the RHS to ensure that some interrupt of its choosing will always run code that calls the RHS.

However, an LHS attacker or error could corrupt the interrupt controller, turn interrupts off, and so on. It is contemplated that ATC (address translation control) is used to ensure that the RHS gets to run every so often. If the RHS is using ATC, it can modify ATC to increment a counter. The counter is set to some value whenever the RHS schedules the archangel. If the counter reaches zero, ATC then knows that the archangel has not run for "too long" and calls a nexus entry point that forcibly runs the archangel. This technique does not guarantee that the archangel runs at any particular time, but does ensure that it will run after a number of LHS memory edit operations. Thus, an LHS that is active will eventually have to let the archangel run.

If the RHS can lock down the IDT and the system has a reliable source of NMIs (non-maskable interrupts), then the RHS can force the NMI handler to call right.

In an exemplary embodiment, the hardware has a timer which forces an interrupt to the RHS after so many ticks.

The present invention provides mechanisms that allow the trustworthiness of one computing environment to be projected to a second computing environment. Two or more operating systems that run on a single machine are examples of "environments" that may need to interact with each other on a single machine, although it will be understood that the invention is not limited to a traditional operating system. Moreover, at least some of the techniques described herein can be used, in the general case, to project trustworthiness from any type of executable entity (e.g., any piece of software) to any other type of entity.

In the case where two entities exist side by side on a single machine and need to interact with each other, the interaction may take various forms. For example, the two entities may need to communicate data back and forth to each other. In the case where the entities are operating systems (or certain other types of execution environments, such as script engines that execute scripts on a virtual machine), the entities may need to interact with each other in certain other ways—e.g., sharing memory, sharing time on a processor, sharing resources, and handling interrupts. The invention provides techniques whereby two entities can engage in these types of interactions with each other, while allowing one entity to project its trustworthiness to the other entity.

The embodiments described above focus on memory as the monitored resource, but the invention is not so limited. If security monitors are available for resources other than memory, a base monitoring agent (e.g., archangel) may employ such monitors as trusted delegates to extend its sphere of trust. For example, if a secure NIC is available, the base monitoring agent may use it to preclude sending packets with certain headers. In general, such a trusted delegate need only understand a measurement invariant, e.g., headers matching <regexp>, and reliably alert the monitoring agent on changes of the invariant.

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed is:

1. A system, comprising:
   a processor;
   a memory;
   an untrusted environment resident in the memory;
   a trusted environment connected to the untrusted environment and resident in a portion of the memory that is inaccessible to the untrusted environment;
   a plurality of monitoring agents running in the trusted environment, each monitoring agent monitoring at least one application, extension, or component running in the untrusted environment; and,
   at least one base monitoring agent running in the trusted environment that monitors the untrusted environment, whereby trustworthiness of the trusted environment is projected into the untrusted environment,
   wherein each monitoring agent is associated with an application in the untrusted environment and each monitoring agent monitors its associated application for attack and inconsistencies.

2. The system of claim 1, wherein each monitoring agent comprises a portion of its associated application.

3. The system of claim 1, wherein each monitoring agent has an adjustable level of inspection for targeting threats to its associated application.

4. The system of claim 1, wherein each monitoring agent receives a secure input and transfer the secure input to the associated application.

5. The system of claim 1, wherein at least one of the monitoring agents monitors application agents running in the trusted environment.

6. The system of claim 1, further comprising another monitoring agent running in the trusted environment, wherein the monitoring agents are in communication with each other.

7. The system of claim 1, wherein the base monitoring agent detects inconsistencies in the untrusted environment.

8. The system of claim 7, further comprising a plurality of monitoring agents that detect inconsistencies in applications running in the untrusted environment.

9. The system of claim 8, further comprising additional monitoring agents that detect inconsistencies in applications running in the trusted environment.

10. The system of claim 1, wherein at least one of the base monitoring agents approves or disapproves an untrusted environment event.

11. The system of claim 10, the at least one base monitoring agent further comprising a secure input for receiving input, wherein the base monitoring agent approves or disapproves the untrusted environment event based on the received input.

12. The system of claim 1, wherein at least one of the base monitoring agents refuses to allow changes to the untrusted environment without receiving approval via a secure input.

13. The system of claim 1, wherein at least one of the base monitoring agents refuses to allow changes to the untrusted environment unless the changes are described by a package that is signed by an approved party.

14. The system of claim 1, further comprising a monitoring agent running in the trusted environment, the monitoring agent monitoring at least one application, extension, or component running in the untrusted environment, wherein the monitoring agent uses sealed storage to keep a secret for an operating system or an application residing in the untrusted environment.

15. The system of claim 14, wherein the monitoring agent refuses to reveal the secret to the operating system or the application unless the operating system or application has a digest that matches the owner of the secret.

16. The system of claim 14, wherein the monitoring agent refuses to reveal the secret to the operating system or the application unless the operating system or application is on a list of digests that may read the secret.

17. The system of claim 14, wherein the monitoring agent uses a predetermined test to determine if a legitimate entity is requesting the secret.

18. The system of claim 17, wherein the predetermined test includes examining the entity's stacks and assuring that the stacks have legal stack contents.

19. The system of claim 1, further comprising a monitoring agent running in the trusted environment, the monitoring agent monitoring at least one application, extension, or component running in the untrusted environment, wherein the monitoring agent edits a state of the untrusted environment to make it secure or otherwise acceptable.

20. The system of claim 19, wherein the state comprises an initial configuration or an error report option.

21. The system of claim 1, wherein the base monitoring agent zeros the physical memory that does not belong to the known good configuration of the untrusted environment or to the trusted environment.

22. The system of claim 1, wherein the untrusted environment comprises a basic input/output system (BIOS), firmware, or loader.

23. The system of claim 1, further comprising a nexus for running the base monitoring agent at boot.

24. The system of claim 1, further comprising a counter in the trusted environment, wherein the counter is used to determine if the base monitoring agent should be run.

25. The system of claim 24, wherein the counter counts the number of untrusted memory edit operations.

26. A method of monitoring an untrusted environment, comprising:
   providing the untrusted environment and an operating system running in the untrusted environment;
   connecting a trusted environment to the untrusted environment;
   providing a plurality of monitoring agents running in the trusted environment;
   associating at least one of the plurality of monitoring agents with at least one application, extension, or component running in the untrusted environment;
   monitoring the at least one application, extension, or component using the at least one of the plurality of monitoring agents;
   providing at least one base monitoring agent running in the trusted environment;
   associating the at least one base monitoring agent with the operating system;
   providing a nexus for running the base monitoring agent at boot;
   binding the monitoring agents to the base monitoring agent and to the nexus; and,
   using the base monitoring agent to monitor the untrusted environment and the operating system for attack and inconsistencies to project trustworthiness of the trusted environment into the untrusted environment.

27. The method of claim 26, further comprising:
   associating each monitoring agent with an application; and monitoring each associated application for attack and inconsistencies.

28. The method of claim 26, further comprising associating an application with one of the monitoring agents, and transferring a portion of the application to the monitoring agent so the portion resides in the trusted environment.

29. The method of claim 26, further comprising associating an application with the monitoring agent and adjusting a level of inspection in the monitoring agent for targeting threats to the associated application.

30. The method of claim 26, further comprising:
associating an application with the monitoring agent;
receiving secure input at the monitoring agent; and,
transferring the secure input to the application.

31. The method of claim 26, wherein the monitoring agents are in communication with each other.

32. The method of claim 26, further comprising using the base monitoring agent to approve or disapprove an untrusted environment event.

33. The method of claim 32, further comprising using the base monitoring agent to receive input from a secure input.

34. The method of claim 26, further comprising the base monitoring agent refusing to allow changes to the untrusted environment without receiving approval via a secure input.

35. The method of claim 26, further comprising the base monitoring agent refusing to allow changes to the untrusted environment unless the changes are described by a package that is signed by an approved party.

36. The method of claim 26, wherein
one of the monitoring agents uses sealed storage to keep a secret for an operating system or an application residing in the untrusted environment.

37. The method of claim 36, wherein the monitoring agent refuses to reveal the secret to the operating system or the application unless the operating system or application has a digest that matches the owner of the secret.

38. The method of claim 36, wherein the monitoring agent refuses to reveal the secret to the operating system or the application unless the operating system or application is on a list of digests that may read the secret.

39. The method of claim 36, further comprising using a predetermined test to determine if a legitimate entity is requesting the secret.

40. The method of claim 39, wherein the predetermined test includes examining the entity's stacks and assuring that the stacks have legal stack contents.

41. The method of claim 26, wherein
one of the monitoring agents is configured to edit a state of the untrusted environment to make it secure or otherwise acceptable.

42. The method of claim 41, wherein the state comprises an initial configuration or an error report option.

43. The method of claim 26, further comprising the base monitoring agent zeroing the physical memory that does not belong to the known good configuration of the untrusted environment or to the trusted environment.

44. The method of claim 26, wherein the untrusted environment comprises a basic input/output system (BIOS), firmware, or loader.

45. The method of claim 26, further comprising determining if the base monitoring agent should be run responsive to a counter.

46. The method of claim 45, wherein the counter counts the number of untrusted memory edit operations.

47. The method of claim 26, further comprising providing a plurality of monitoring agents that detect inconsistencies in applications running in the untrusted environment.

48. The method of claim 47, further comprising providing additional monitoring agents that detect inconsistencies in applications running in the trusted environment.

49. A system, comprising:
a processor;
a memory;
a trusted environment resident in the memory and having at least one of an operating system, firmware, and a basic input/output system (BIOS);
an untrusted environment resident in the memory;
at least one monitoring agent running in the trusted environment and associated with at least one of the operating system, the firmware, and the BIOS, and associated with an application running in the untrusted environment;
a nexus; and
at least one base monitoring agent running in the trusted environment that monitors the untrusted environment, whereby trustworthiness of the trusted environment is projected into the untrusted environment, the base monitoring agent being bound, linked, or compiled into the nexus.

50. The system of claim 49, wherein the at least one monitoring agent comprises a plurality of monitoring agents, each monitoring agent having an associated power.

51. The system of claim 49, wherein the trusted environment runs on a first processor architecture and the untrusted environment runs on a second processor architecture, the system further comprising a base monitoring agent running on the first processor.

52. The system of claim 49, wherein the trusted environment and the untrusted environment run on the same processor, the system further comprising a base monitoring agent running in the trusted environment.

53. The system of claim 49, wherein the trusted environment runs on a first processor and the untrusted environment runs on a second processor, the first and second processors being capable of running in either a trusted mode or an untrusted mode.

54. The system of claim 49, further comprising a nexus and a base monitoring agent residing in the trusted environment, wherein the base monitoring agent is a user mode processor running on the nexus.

55. The system of claim 49, further comprising a base monitoring agent residing in the trusted environment, wherein the base monitoring agent is developed by, with, and in the same or a related build environment as an operating system of the untrusted environment.

56. The system of claim 49, further comprising a base monitoring agent residing in the trusted environment, the base monitoring agent being part of a trusted-computing-base for security evaluation.

57. The system of claim 49, further comprising a base monitoring agent, wherein a first portion of the base monitoring agent resides in the trusted environment and a second portion of the base monitoring agent resides on a physically remote machine, the first and second portions of the base monitoring agent being connected by a secure link.

58. A system, comprising:
a processor;
a memory;
an untrusted environment resident in the memory;
an operating system running in the untrusted environment;
an application running in the untrusted environment;
a trusted environment resident in a portion of the memory that is inaccessible to the untrusted environment;

a monitoring agent running in the trusted environment and providing projection of trustworthiness of the trusted environment to the application running in the untrusted environment; and, a base monitoring agent associated with the operating system and running in the trusted environment, the base monitoring agent configured to monitor the monitoring agent and the untrusted environment, wherein the agent is a virtual machine agent, and the monitoring agent is a virtual machine monitoring agent.

59. The system of claim 58, wherein the base monitoring agent is a virtual machine base monitoring agent and projects an operating system image in the virtual machine agent.

60. The system of claim 58, further comprising an application associated with the virtual machine monitoring agent, wherein the base monitoring agent is a virtual machine base monitoring agent and provides projection to the application.

* * * * *